(12) United States Patent
Lim

(10) Patent No.: US 10,798,543 B2
(45) Date of Patent: Oct. 6, 2020

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventor: Ji Hyun Lim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 262 days.

(21) Appl. No.: 15/962,818

(22) Filed: Apr. 25, 2018

(65) Prior Publication Data
US 2019/0174281 A1    Jun. 6, 2019

(30) Foreign Application Priority Data
Dec. 2, 2017    (KR) .......................... 10-2017-0164689

(51) Int. Cl.
| | |
|---|---|
| *H04W 4/46* | (2018.01) |
| *G08G 1/052* | (2006.01) |
| *H04W 76/10* | (2018.01) |
| *G08G 1/01* | (2006.01) |
| *H04W 4/02* | (2018.01) |

(52) U.S. Cl.
CPC ............ *H04W 4/46* (2018.02); *G08G 1/0112* (2013.01); *G08G 1/0133* (2013.01); *G08G 1/0141* (2013.01); *G08G 1/052* (2013.01); *H04W 76/10* (2018.02); *H04W 4/027* (2013.01)

(58) Field of Classification Search
CPC ......... H04W 4/46; H04W 4/027; H04W 4/40; H04W 4/44; H04W 4/48; H04W 76/10; H04W 84/005; H04W 84/18; H04W 84/20; G08G 1/0141; G08G 1/0133; G08G 1/0112; G08G 1/052
See application file for complete search history.

(56) References Cited

U.S. PATENT DOCUMENTS

| | | | | |
|---|---|---|---|---|
| 2009/0092060 A1* | 4/2009 | Goto | .................. | H04W 12/0401 370/254 |
| 2012/0268295 A1* | 10/2012 | Yuse | ..................... | G08G 1/0104 340/905 |
| 2015/0199905 A1* | 7/2015 | Hayee | ..................... | G08G 1/162 701/118 |
| 2019/0122540 A1* | 4/2019 | Ishikawa | ........... | G08G 1/096791 |

* cited by examiner

*Primary Examiner* — Ricardo H Castaneyra
(74) *Attorney, Agent, or Firm* — Brinks Gilson & Lione

(57) ABSTRACT

Disclosed herein are a vehicle and a control method of the vehicle. The vehicle includes a communication device which communicates with a nearby vehicle in a predetermined range based on the Vehicle-to-Vehicle (V2V) communication method, and a controller which forms a network with the nearby vehicle and calculate representative speed of the network based on at least one of speed information of the vehicle or speed information of the nearby vehicle, and the controller calculates link speed of a road link based on the representative speed of the network.

18 Claims, 9 Drawing Sheets

VEHICLE AND CONTROL METHOD THEREOF

CROSS-REFERENCE TO RELATED APPLICATION

This application claims priority to and the benefit of Korean Patent Application No. 10-2017-0164689, filed on Dec. 2, 2017, which is incorporated herein by reference in its entirety.

FIELD

The present disclosure relates to a vehicle and control method thereof for collecting traffic information through vehicle-to-vehicle (V2V).

BACKGROUND

The statements in this section merely provide background information related to the present disclosure and may not constitute prior art.

V2X communication refers to a system to allow vehicles to share information with other portable terminals, communication networks or other vehicles, i.e., a technology to allow communication between vehicles and any interfaces.

Specifically, V2X includes the form of Vehicle-to-Nomadic devices (V2N), Vehicle-to-Vehicle (V2V), and Vehicle-to-Infrastructure (V2I).

The V2X communication may bring about a new paradigm change in communication methods of vehicles.

Meanwhile, the conventional entity that creates and provides traffic information is a traffic information center. The traffic information center requires huge investment and extra operation costs. Furthermore, information collection and communication devices may be installed on every road for the traffic information center to collect the information.

The traffic information transmitted via the traffic information center is originated from a limited number of sample vehicles.

SUMMARY

The present disclosure provides a vehicle and control method thereof for collecting traffic information desired by the vehicle in real time through Vehicle-to-Vehicle (V2V) and using the traffic information to improve the quality of navigation services.

In accordance with one aspect of the present disclosure, a vehicle includes a communication device configured to communicate with a nearby vehicle in a predetermined range based on the Vehicle-to-Vehicle (V2V) communication method, and a controller configured to form a network with the nearby vehicle and calculate representative speed of the network based on at least one of speed information of the vehicle or speed information of the nearby vehicle. The controller is configured to calculate a link speed of a road link based on the representative speed of the network.

The controller may be configured to determine the representative speed of the network as the link speed of the road link when a difference in size between the network and the road link is less than a predetermined margin of error.

The controller may be configured to calculate the link speed of the road link based on the representative speed of the network and representative speed of another network located in the road link, when the size of the network is smaller than the size of the road link.

The communication device may be configured to receive a representative speed of another network located in the road link from another vehicle, and the controller may be configured to calculate an average of the representative speed of the network and the representative speed of another network located in the road link for the link speed of the road link, when the size of the network is smaller than the size of the road link.

The communication device may be configured to receive the representative speed of another network located in the road link from another vehicle, and the controller may be configured to calculate the link speed of the road link with the following equation, when the size of the network is smaller than the size of the road link:

$$VL = \frac{DL}{\sum_{i=1}^{n} Ti},$$

$$Ti = \frac{Di}{Vi}$$

where VL denotes a link speed of the road link, DL denotes a length of the entire section of the road link, Di denotes a length of a partial section occupied by an i-th network located in the road link, and Vi denotes a representative speed of the i-th network located in the road link.

The controller may be configured to determine the representative speed of the network as the link speed of the road link when the size of the network is larger than the size of the road link.

The communication device may be configured to send or receive a preoccupancy signal for representative status to or from the nearby vehicle, and the controller may be configured to calculate representative speed of the network based on speed information of the nearby vehicle, when the vehicle sends the preoccupancy signal earlier than the nearby vehicle.

The communication device may be configured to send to or receive from the nearby vehicle a preoccupancy signal for representative status, and the controller may be configured to calculate the representative speed of the network based on speed information of the nearby vehicle, when the vehicle sends the preoccupancy signal earlier than the nearby vehicle and receives a signal to agree with the preoccupancy from the nearby vehicle.

The communication device may be configured to send to or receive from the nearby vehicle a preoccupancy signal for representative status, and the controller may be configured to select a representative vehicle by comparing a preoccupancy value of the preoccupancy signal sent from the vehicle with a preoccupancy value of the preoccupancy signal sent from the nearby vehicle, when the vehicle and the nearby vehicle simultaneously send the preoccupancy signals.

The controller may be configured to calculate representative speed of the network based on the speed information of the nearby vehicle, when the vehicle is selected as the representative vehicle.

In accordance with another aspect of the present disclosure, a control method of a vehicle, the control method includes receiving speed information from a nearby vehicle in a predetermined range, calculating by a controller a representative speed of a network formed by the vehicle and the nearby vehicle based on at least one of speed information of the vehicle or speed information of the nearby vehicle, and calculating by the controller a link speed of a road link based on the representative speed of the network.

The calculating of the link speed may include determining the representative speed of the network as the link speed of the road link when the size of the network and the size of the road link are in the same range.

The calculating of the link speed may include calculating the link speed of the road link based on the representative speed of the network and a representative speed of another network located in the road link, when the size of the network is smaller than the size of the road link.

The control method may further include receiving the representative speed of another network located in the road link from another vehicle before the calculating of the link speed, the calculating of the link speed may include calculating an average of the representative speed of the network and the representative speed of another network located in the road link for the link speed of the road link, when the size of the network is smaller than the size of the road link.

The control method may further include the receiving representative speed of another network located in the road link from another vehicle before the calculating of the link speed, the calculating of the link speed may include calculating the link speed of the road link with the following equation, when the size of the network is smaller than the size of the road link:

$$VL = \frac{DL}{\sum_{i=1}^{n} Ti},$$

$$Ti = \frac{Di}{Vi}$$

where VL denotes a link speed of the road link, DL denotes a length of the entire section of the road link, Di denotes a length of a partial section occupied by an i-th network located in the road link, and Vi denotes a representative speed of the i-th network located in the road link.

The calculating of the link speed may include determining the representative speed of the network as the link speed of the road link when the size of the network is larger than the size of the road link.

The control method may further include sending to or receiving from the nearby vehicle a preoccupancy signal for representative status before the receiving of the speed information from the nearby vehicle, the calculating of the representative speed may include calculating the representative speed of the network based on speed information of the nearby vehicle, when the vehicle sends the preoccupancy signal earlier than the nearby vehicle.

The control method may further include sending to or receiving from the nearby vehicle a preoccupancy signal for representative status before the receiving of the speed information, the calculating of the representative speed may include calculating the representative speed of the network based on speed information of the nearby vehicle, when the vehicle sends the preoccupancy signal earlier than the nearby vehicle and receives a signal to agree with the preoccupancy signal from the nearby vehicle.

The control method may further include before the receiving of the speed information from the nearby vehicle, communicating between the first vehicle and the nearby vehicle to send or receive a preoccupancy signal for representative status, and selecting a representative vehicle by comparing a preoccupancy value of the preoccupancy signal sent from the vehicle with a preoccupancy value of the preoccupancy signal sent from the nearby vehicle, when the vehicle and the nearby vehicle simultaneously send the preoccupancy signal.

The calculating of the representative speed may include calculating the representative speed of the network based on speed information of the nearby vehicle, when the vehicle is selected as the representative vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
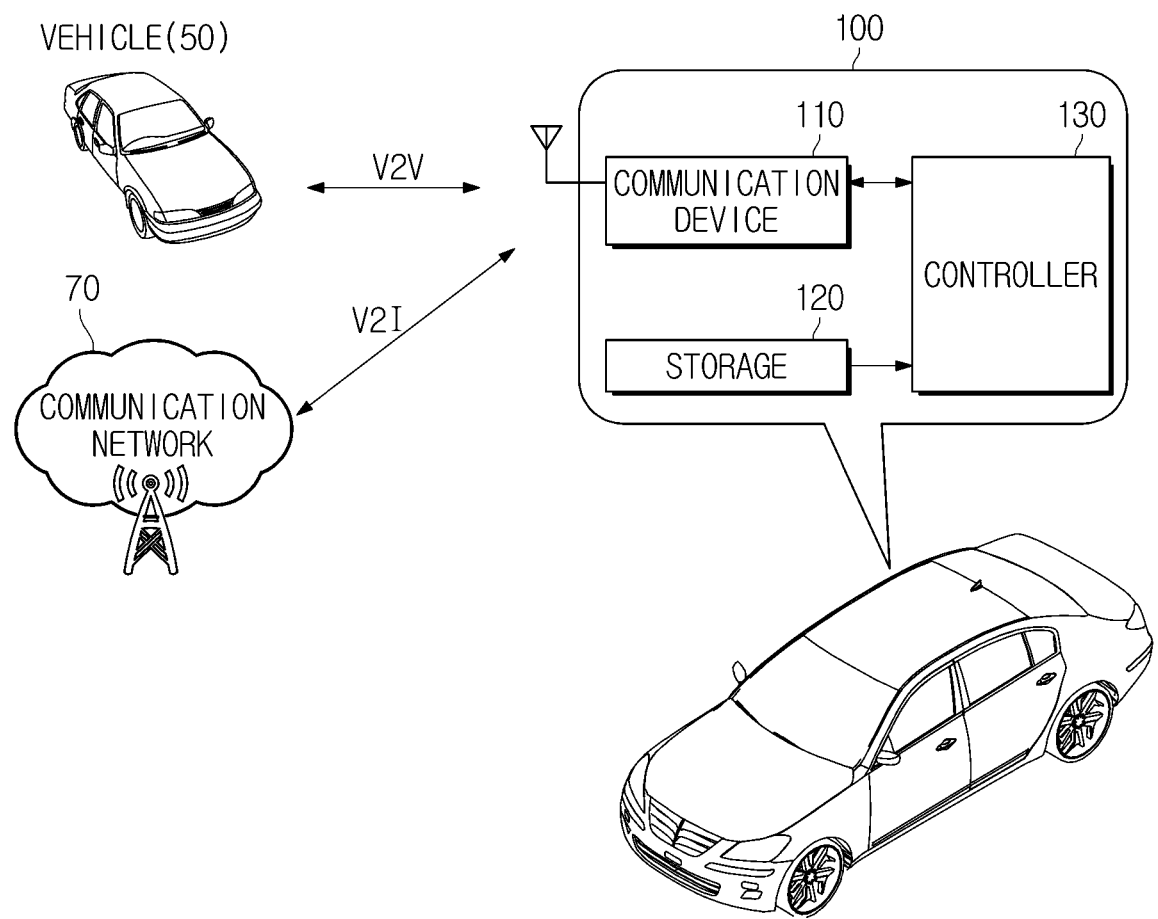
FIG. 1 is a control block diagram of a vehicle that communicates with the outside world.

The drawings described herein are for illustration purposes only and are not intended to limit the scope of the present disclosure in any way.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary forms will now be described more fully hereinafter with reference to the accompanying drawings. The exemplary forms may, however, be embodied in many different forms and should not be construed as being limited to the forms set forth herein. These forms are provided so that this disclosure will be thorough and complete and will fully convey the exemplary forms to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular forms only and is not intended to be limiting. As used herein, the singular forms "a," "an," and "the," are intended to include the plural forms as well, unless the context clearly indicates otherwise.

Reference will now be made in detail to the exemplary forms of the present disclosure, examples of which are illustrated in the accompanying drawings, wherein like reference numerals refer to like elements throughout.

FIG. 1 is a control block diagram of a vehicle that communicates with the outside world, according to one form of the present disclosure.

Referring to FIG. 1, a vehicle 100 may include a communication device 110, a storage 120, and a controller 130.

The communication device 110 may receive traffic information from the outside, e.g., from a nearby vehicle 50 and a communication network 70. The communication device 110 stores the received traffic information in the storage 120 by the controller 130.

A technology for the communication device 110 to send and receive various information is referred to as V2X communication.

The V2X communication refers to a system to allow the vehicle 100 to share information with other portable terminals, communication networks or other vehicles, i.e., a technology to allow communication between vehicles and any interfaces.

Specifically, the V2X may include the form of Vehicle-to-Nomadic devices (V2N), Vehicle-to-Vehicle (V2V), and Vehicle-to-Infrastructure (V2I), and the vehicle 100 may receive traffic information through communication with the nearby vehicle 50 and create final traffic information of the path.

The V2X communication used by the communication device 110 uses Dedicated Short Range Communication (DSRC) or Wireless Access in Vehicular Environment (WAVE) as a standard for the vehicle 100 to communicate with the nearby vehicle 50 at frequencies of about 5.9 GHz band.

The communication device 110 may perform communication with the nearby vehicle 50 included in a predetermined range. For example, the communication device 110 may receive data about traffic information from the nearby vehicle 50 located within the radius of about 300 m to about 500 m.

Furthermore, the communication device 110 may send a preoccupancy signal to preoccupy the status as a representative vehicle to the nearby vehicle 50 located within the predetermined range, or receive the preoccupancy signal from the nearby vehicle 50. Preoccupation of the status as a representative vehicle will be described later.

The aforementioned range or standard are merely an example of how the communication device 110 communicates with the nearby vehicle 50, and may vary in other forms.

The communication device 110 may include one or more components that enable communication with an external device, for example, at least one of a short-range communication module, a wired communication module, and a wireless communication module.

The short-range communication module may include various short range communication modules for transmitting and receiving signals within a short range over a wireless communication network, such as Bluetooth module, an infrared communication module, a radio frequency identification (RFID) communication module, a wireless local access network (WLAN) communication module, a near field communication (NFC) module, a Zigbee communication module, etc.

The wireless communication module may include a wireless fidelity (WiFi) module, a wireless broadband (Wibro) module, and/or any wireless communication module for supporting various wireless communication schemes, such as a global system for mobile communication (GSM) module, a code division multiple access (CDMA) module, a wideband code division multiple access (WCDMA) module, a universal mobile telecommunications system (UMTS), a time division multiple access (TDMA) module, a long term evolution (LTE) module, etc.

The wireless communication module may also include a wireless communication interface with an antenna and transmitter for transmitting signals to the nearby vehicle 50. Furthermore, the wireless communication module may further include a signal conversion module for modulating a digital control signal output from the controller 130 through the wireless communication interface to an analog wireless signal under the control of the controller 130.

The wireless communication module may also include a wireless communication interface with an antenna and receiver for receiving signals from the nearby vehicle 50. The wireless communication module may further include a signal conversion module for demodulating a received analog radio signal into a digital control signal through the wireless communication interface.

The communication device 110 may further include a wired communication module to exchange data with components in the vehicle 100, which may include any of various cable communication modules, such as Controller Area Network (CAN), Local Interconnect Network (LIN), Media Oriented System Transport (MOST) communication modules, and the like.

The storage 120 may store traffic information received by the communication device 110 from the nearby vehicle 50 and play a role in storing road traffic information on the navigation system based on the traffic information received by the controller 130.

The traffic information stored may include safety-related information, e.g., accident information, sent from the nearby vehicle 50 moving ahead of the vehicle 100, and include information about at least one of speed limits and speeds of a plurality of vehicles moving within a certain range.

The storage 120 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, without being limited thereto. The storage 120 may be a memory implemented with a chip separated from the aforementioned processor in relation to the controller 130, or may be implemented integrally with the processor in a single chip.

The controller 130 is a processor responsible for controlling general operation of the vehicle 100 and controls respective components of the vehicle 100 including the communication device 110 and the storage 120.

The controller 130 may be integrated with a storage medium that may store data, in a System on Chip (SoC) embedded in the vehicle 100. In this regard, there may be not only one but multiple SoCs embedded in the vehicle 100, and the aforementioned components may not be limited to being integrated in a single SoC.

The controller 130 may send a preoccupancy signal to preoccupy the status as a representative vehicle to the nearby vehicle 50 located within a predetermined range.

Figure 2:
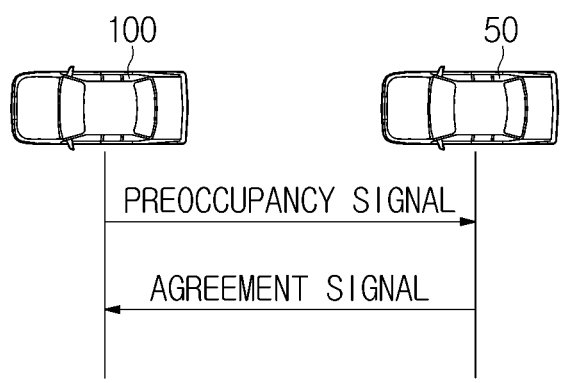
FIGS. 2 and 3 are schematic views illustrating how to select a representative vehicle.
Figure 3:
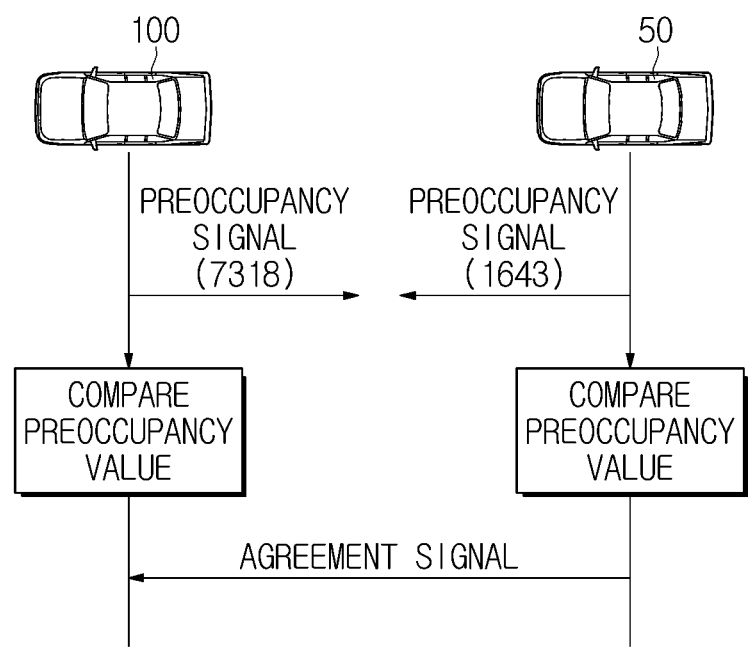

FIGS. 2 and 3 are schematic views illustrating how to select a representative vehicle. For convenience of explanation, an occasion when the vehicle 100 becomes a representative vehicle for the nearby vehicle 50 included in a predetermined range will be focused.

Referring to FIG. 2, a vehicle, e.g., the vehicle 100, which is the first one to send the preoccupancy signal to nearby vehicles, e.g., the nearby vehicle 50, located in the predetermined range becomes the representative vehicle. Accordingly, if the vehicle 100 sends the preoccupancy signal to the nearby vehicle 100 earlier than receiving the preoccupancy signal from the nearby vehicle 50, the controller 130 of the vehicle 100 may select the vehicle 100 as the representative vehicle. Upon reception of the preoccupancy signal from the vehicle 100, the nearby vehicle 50 may send a signal to agree with the preoccupancy of the vehicle 100 to the vehicle 100.

On the other hand, if the vehicle 100 and the nearby vehicle 50 simultaneously send the preoccupancy signal to each other, any of them may be the representative vehicle. For example, the controller 130 may send the preoccupancy signal including a numerical value (hereinafter, called a preoccupancy value) to the nearby vehicle 50, and compare the sent preoccupancy value of the vehicle 100 with the received preoccupancy value of the nearby vehicle 50 to determine the vehicle that sent smaller or larger preoccupancy value as the representative vehicle.

As shown in FIG. 3, if the vehicle 100 sends the preoccupancy value of '7318' while the nearby vehicle 50 sends the preoccupancy value of '1643', the vehicle 100 and the nearby vehicle 50 may select the vehicle 100 that sends the larger value as the representative vehicle.

Once the vehicle 100 is selected as the representative vehicle, the controller 130 may form a network centered on the representative vehicle. The network formed to be centered on the vehicle 100 represents a network between the vehicle 100 and one or more nearby vehicles 50 in a predetermined range from the vehicle 100.

Figure 4:
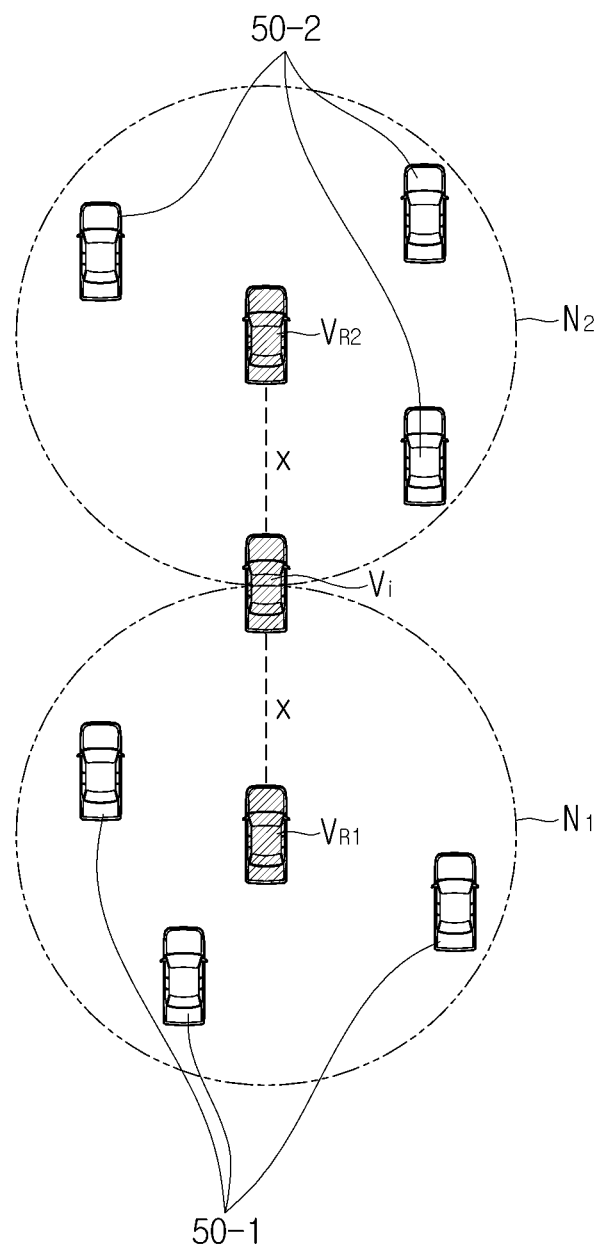
FIGS. 4 and 5 are schematic views of a network formed by vehicles.
Figure 5:
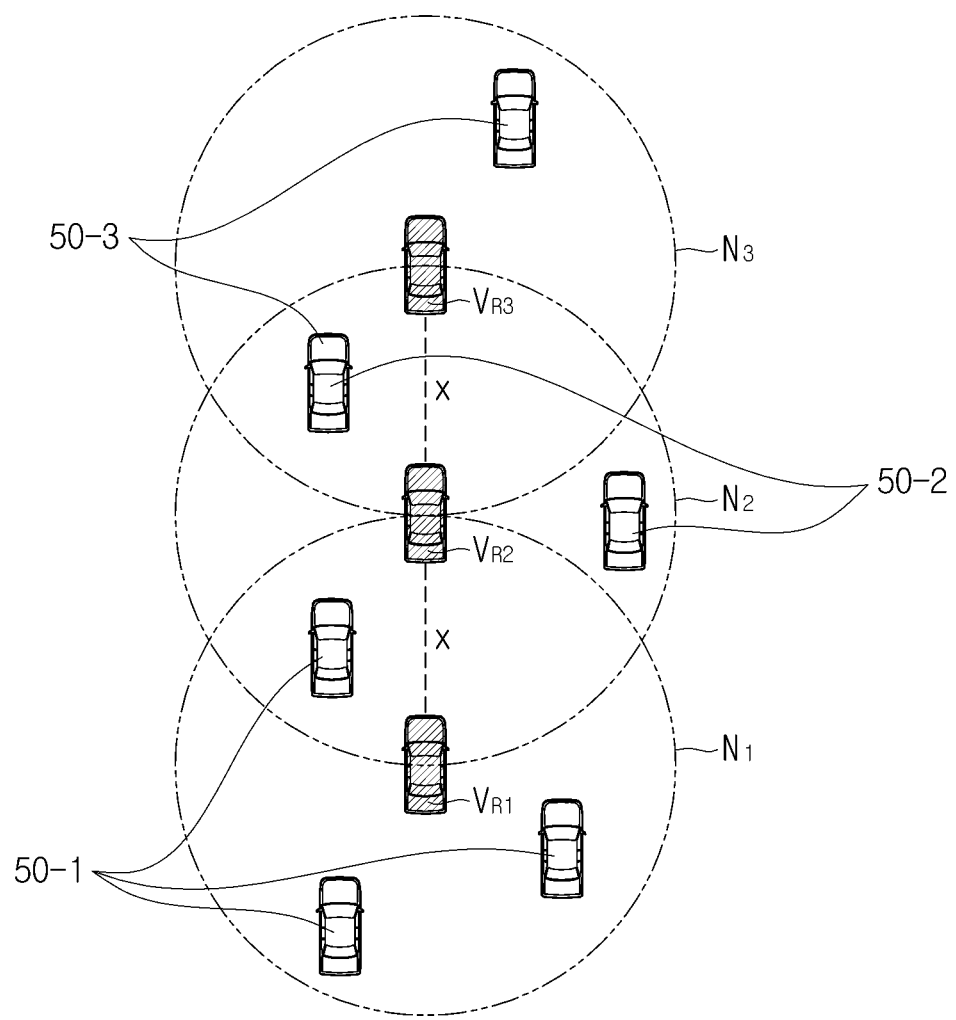

FIGS. 4 and 5 are schematic views of a network formed by vehicles. In the following description, it is assumed that vehicles may include the same elements as the vehicle 100 has as shown in FIG. 1. Accordingly, in the following description, like elements of vehicles may refer to like reference numerals as shown in FIG. 1.

In the first step to form a network, as described above, the vehicle 100 is selected as a first representative vehicle $V_{R1}$ through the procedure of sending and receiving the preoccupancy signal.

Referring to FIG. 4, in one form, the controller 130 of the first representative vehicle $V_{R1}$ may form a first network N1 with nearby vehicles 50-1 and Vi in a predetermined range x from the first representative vehicle $V_{R1}$.

The controller 130 of the first representative vehicle $V_{R1}$ may designate the farthest vehicle Vi from the first representative vehicle $V_{R1}$ as a relay vehicle among the nearby vehicles 50-1 and Vi in the predetermined range x and control the communication device 110 to send the designation signal to the relay vehicle Vi.

Upon reception of the designation signal, the controller 130 of the relay vehicle Vi may designate a farthest vehicle $V_{R2}$ from the relay vehicle Vi in the predetermined range x except the first representative vehicle $V_{R1}$ as a second representative vehicle $V_{R2}$, and control the communication device 110 to send a second representative vehicle designation signal to the second representative vehicle $V_{R2}$.

Upon reception of the designation signal, the controller 130 of the second representative vehicle $V_{R2}$ may form a second network N2 with nearby vehicles 50-2 and Vi in a predetermined range x from the second representative vehicle $V_{R2}$.

The communication device 110 of the first representative vehicle $V_{R1}$ may collect traffic information including speed information from the nearby vehicles 50-1 and Vi included in the first network N1, and the controller 130 of the first representative vehicle $V_{R1}$ may calculate a representative speed of the vehicles $V_{R1}$, Vi, and 50-1 that form the first network N1 based on the collected speed information of the nearby vehicles 50-1 and Vi. For example, the controller 130 of the first representative vehicle $V_{R1}$ may calculate an average speed of the vehicles $V_{R1}$, Vi, and 50-1 that form the first network N1 as the representative speed.

The communication device 110 of the second representative vehicle $V_{R2}$ may collect traffic information including speed information from the nearby vehicles 50-2 and Vi included in the second network N2, and the controller 130 of the second representative vehicle $V_{R2}$ may calculate a representative speed of the vehicles $V_{R2}$, Vi, and 50-2 that form the second network N2 based on the collected speed information of the nearby vehicles 50-2 and Vi. For example, the controller 130 of the second representative vehicle $V_{R2}$ may calculate an average speed of the vehicles $V_{R1}$, Vi, and 50-2 that form the second network N2 as the representative speed.

The relay vehicle Vi forwards the representative speed of the first network N1 to the second representative vehicle $V_{R2}$, or forwards the representative speed of the second network N2 to the first representative vehicle $V_{R1}$. Accordingly, the first representative vehicle $V_{R1}$ and the second representative vehicle $V_{R2}$ may send and receive mutual traffic information in the relaying method.

Referring to FIG. 5, in another form, similar to the previous form, the controller 130 of the first representative vehicle $V_{R1}$ may form the first network N1 with nearby vehicles 50-1 and $V_{R2}$ in the predetermined range x from the first representative vehicle $V_{R1}$.

The difference from the previous form is that the controller 130 of the first representative vehicle $V_{R1}$ may designate the farthest vehicle $V_{R2}$ from the first representative vehicle $V_{R1}$ as a second representative vehicle among the nearby vehicles 50-1 and $V_{R2}$ in the predetermined range x and control the communication device 110 to send the designation signal to the second representative vehicle $V_{R2}$.

Upon reception of the designation signal, the controller 130 of the second representative vehicle VR2 may form the second network N2 with nearby vehicles 50-2, $V_{R1}$, and $V_{R3}$ in the predetermined range x from the second representative vehicle $V_{R2}$.

The controller 130 of the second representative vehicle $V_{R2}$ may designate a farthest vehicle $V_{R3}$ from the second representative vehicle $V_{R2}$ in the predetermined range x except the first representative vehicle $V_{R1}$ as a third representative vehicle, and control the communication device 110 to send a third representative vehicle designation signal to the third representative vehicle $V_{R3}$.

Upon reception of the designation signal, the controller 130 of the third representative vehicle $V_{R3}$ may form a third network N3 with nearby vehicles 50-3 and $V_{R2}$ in a predetermined range x from the third representative vehicle $V_{R3}$.

The communication device 110 of the first representative vehicle $V_{R1}$ may collect traffic information including speed information from the nearby vehicles 50-1 and $V_{R2}$ included in the first network N1, and the controller 130 of the first representative vehicle $V_{R1}$ may calculate a representative speed of the vehicles $V_{R1}$, $V_{R2}$, and 50-1 that form the first network N1 based on the speed information of the nearby vehicles 50-1 and $V_{R2}$. For example, the controller 130 of the first representative vehicle $V_{R1}$ may calculate an average speed of the vehicles $V_{R1}$, $V_{R2}$, and 50-1 that form the first network N1 as the representative speed.

The communication device 110 of the second representative vehicle $V_{R2}$ may collect traffic information including speed information from the nearby vehicles 50-2, $V_{R1}$, and $V_{R3}$ included in the second network N2, and the controller 130 of the second representative vehicle $V_{R2}$ may calculate a representative speed of the vehicles $V_{R1}$, $V_{R2}$, $V_{R3}$, and 50-2 that form the second network N2 based on the collected speed information of the nearby vehicles 50-2, $V_{R1}$, and $V_{R3}$. For example, the controller 130 of the second representative vehicle $V_{R2}$ may calculate an average speed of the vehicles $V_{R1}$, $V_{R2}$, $V_{R3}$, and 50-2 that form the second network N2 as the representative speed.

The communication device 110 of the third representative vehicle $V_{R3}$ may collect traffic information including speed information from the nearby vehicles 50-3 and $V_{R2}$ included in the third network N3, and the controller 130 of the third representative vehicle $V_{R3}$ may calculate a representative speed of the vehicles $V_{R1}$, $V_{R3}$, and 50-3 that form the third network N3 based on the collected speed information of the nearby vehicles 50-3 and $V_{R2}$. For example, the controller 130 of the third representative vehicle $V_{R3}$ may calculate an average speed of the vehicles $V_{R2}$, $V_{R3}$, and 50-3 that form the third network N3 as the representative speed.

In the meantime, if the size of a network is in the same range as the size of a road link on a navigation map, the representative speed of the network may be a link speed of the corresponding road link on the navigation map.

The size of the network may refer to a maximum range in which the network may be formed, and the size of the road link may refer to the sectional length of the road link.

Furthermore, being in the same range refers to the size of the road link being almost the same as the size of the network size, i.e., a difference in size between the road link and the network being less than a predetermined margin of error. For convenience of explanation, an occasion when the size of the network is the same as the size of the road link, i.e., the difference between them is zero, will now be focused.

Figure 6:
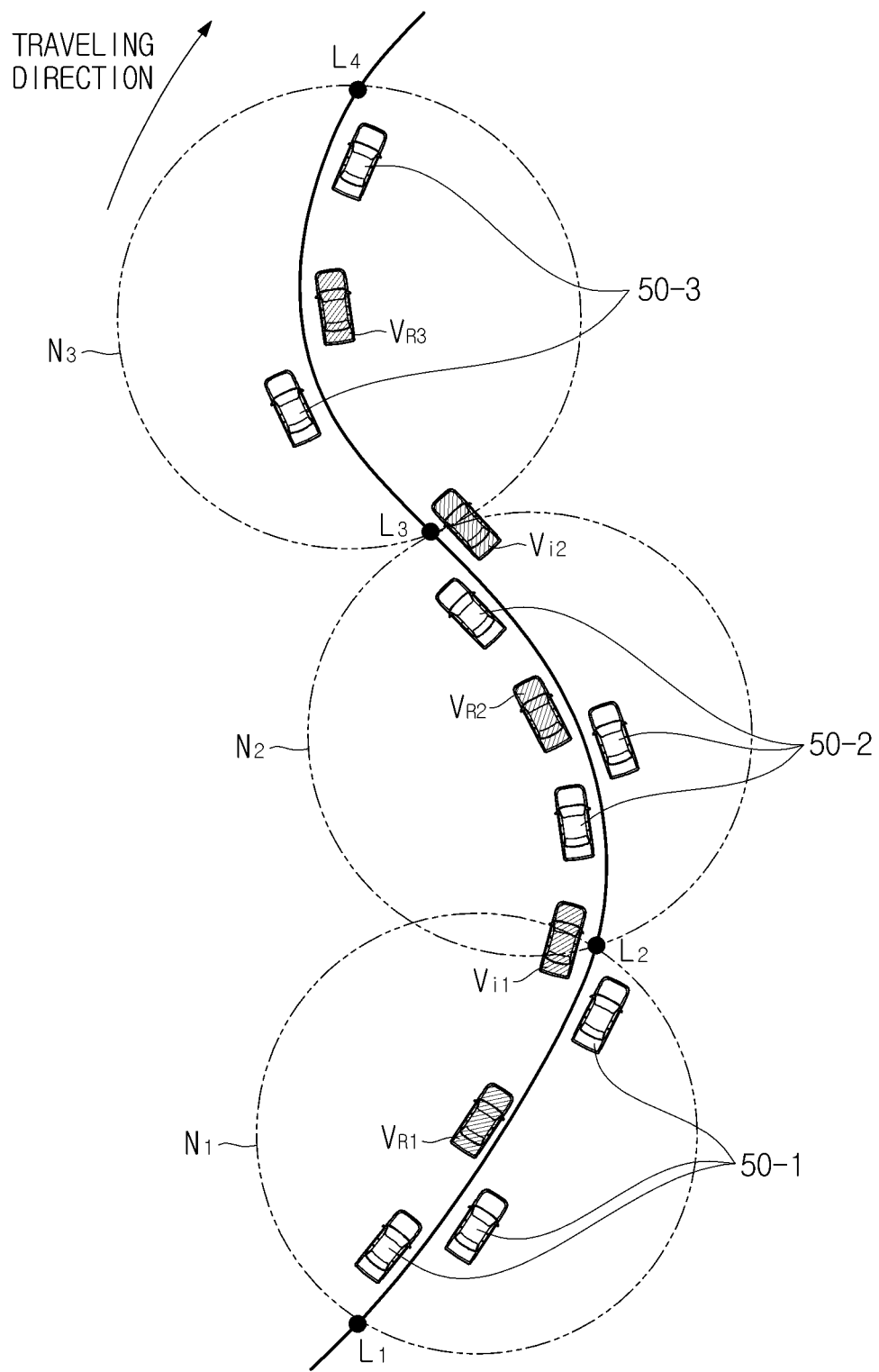
FIG. 6 is a view for explaining link speed of a road link calculated if the size of a network is the same as the size of the road link.

FIG. 6 is a view for explaining link speed of a road link calculated if the size of a network is the same as the size of the road link. Although an occasion when networks N1, N2, and N3 are formed by selecting the representative vehicles $V_{R1}$, $V_{R2}$, and $V_{R3}$ and relay vehicles $V_{i1}$ and $V_{i2}$, as described above, is taken as an example in the following description for convenience of explanation, there may be different networks formed in other forms.

The controller 130 of each of the representative vehicles $V_{R1}$, $V_{R2}$, and $V_{R3}$, that represent the networks N1, N2 and N3, respectively, calculates a representative speed of each network N1, N2, N3.

Since the size of the first network N1 is equal to the size of the first road link (L1~L2), the controller 130 of the first representative vehicle $V_{R1}$ determines the representative speed of the first network N1 to be the link speed of the first road link (L1~L2). The determined link speed of the first road link (L1~L2) may be informed to dependent vehicles 50-1 and $V_{i1}$ that form the first network N1.

Likewise, since the size of the second network N2 is equal to the size of the second road link (L2~L3), the controller 130 of the second representative vehicle $V_{R2}$ determines the representative speed of the second network N2 to be the link speed of the second road link (L2~L3). The determined link speed of the second road link (L2~L3) may be informed to dependent vehicles 50-2 and $V_{i2}$ that form the second network N2.

Likewise, since the size of the third network N3 is equal to the size of the third road link (L3~L4), the controller 130 of the third representative vehicle $V_{R3}$ determines the representative speed of the third network N3 to be the link speed of the third road link (L3~L4). The determined link speed of the third road link (L3~L4) may be informed to dependent vehicles 50-3 and $V_{i3}$ that form the third network N3.

Information created about the link speed of each road link may be sent to a traffic control center through the communication device 110 of each representative vehicle $V_{R1}$, $V_{R2}$, $V_{R3}$, or sent to another vehicle moving behind on the path through the V2V communication.

On the other hand, if the size of a network is smaller than the size of a road link on the navigation map, link speed of the road link may be calculated in a different method using representative speeds of a plurality of networks located on the road link.

Figure 7:
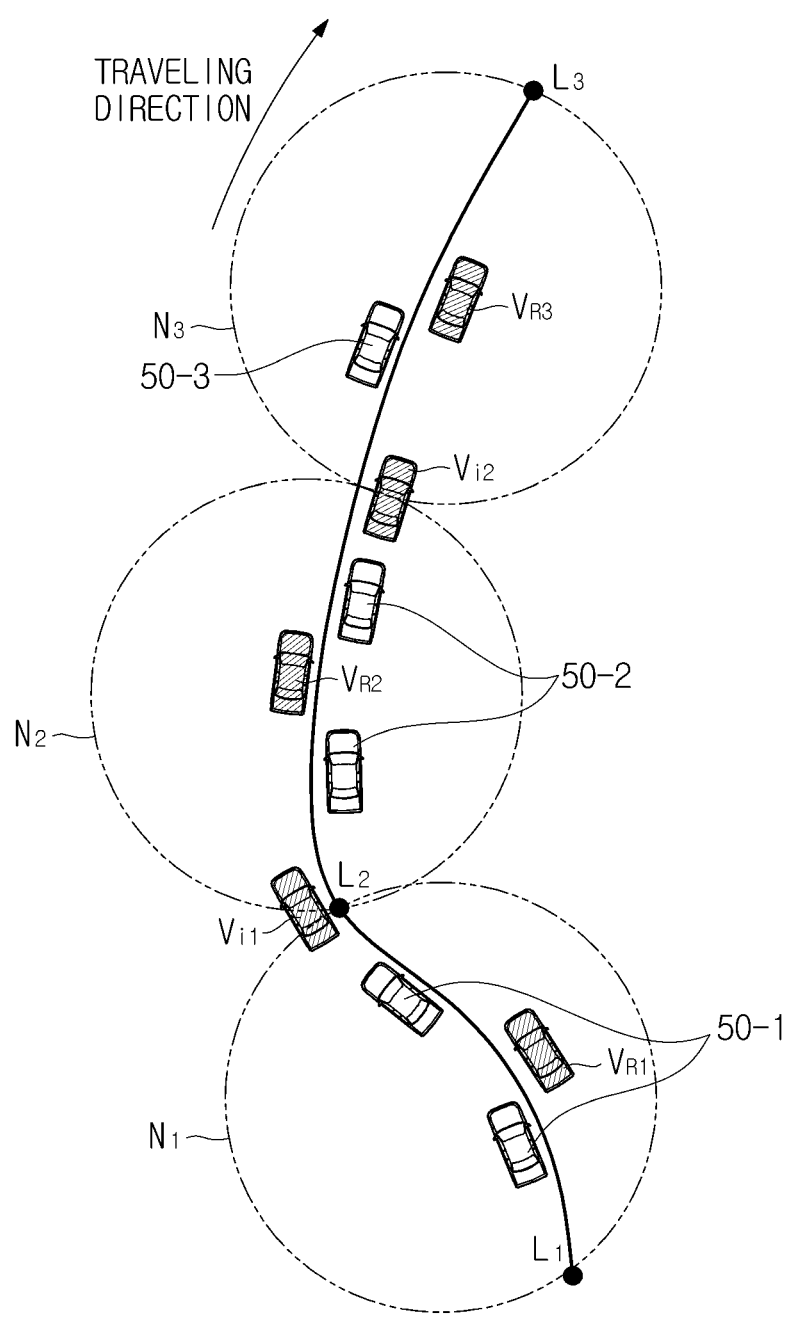
FIG. 7 is a view for explaining link speed of a road link calculated if the size of a network is smaller than the size of the road link.

FIG. 7 is a view for explaining link speed of a road link calculated if the size of a network is smaller than the size of the road link.

The controller 130 of each of the representative vehicles $V_{R1}$, $V_{R2}$ and $V_{R3}$ that represent the networks N1, N2 and N3, respectively, calculates a representative speed of each network N1, N2, N3.

However, unlike the first road link (L1~L2), since the plurality of networks N2 and N3 are located in the second road link (L2~L3), the link speed of the second road link (L2~L3) is determined based on the representative speeds of the second and third networks N2 and N3.

One of the second representative vehicle $V_{R2}$ and the third representative vehicle $V_{R3}$ may calculate the link speed of the second road link (L2~L3), which may be shared with the vehicles $V_{R1}$, $V_{R2}$, 50-1, 50-2, $V_{i1}$, $V_{i2}$ located in the second road link (L2~L3).

For example, one of the second representative vehicle $V_{R2}$ and the third representative vehicle $V_{R3}$ located in the second road link (L2~L3) may be selected as a representative link vehicle of the second road link (L2~L3) in the method of selecting a representative as described above in connection with FIGS. 2 and 3, and the controller 130 of the representative link vehicle may calculate the link speed of the second road link (L2~L3). The calculated link speed of the second road link (L2~L3) may be informed by the communication device 110 of the representative link vehicle to other representative vehicle(s) located in the second road link (L2~L3) or to a traffic control center.

The controller 130 of the representative link vehicle may calculate an average value of representative speeds of the plurality of networks N2, N3 located in the second road link (L2~L3) as the link speed of the second road link (L2~L3).

Furthermore, the controller 130 of the representative link vehicle may calculate the link speed using the following equation 1:

$$VL = \frac{DL}{\sum_{i=1}^{n} Ti} \quad (1)$$

$$Ti = \frac{Di}{Vi}$$

where VL denotes link speed, DL denotes length of the entire section of the road link, Di denotes length of a partial section occupied by the i-th network located in the road link, and Vi denotes representative speed of the i-th network located in the road link. The length of a partial section of the road link occupied by the network may be calculated based on the size of the network (e.g., 2× in FIGS. 2 and 3).

On the other hand, if the size of a network is larger than the size of a road link on the navigation map, link speed of a plurality of road links included in the network may be calculated in a different method using the representative speed of the network.

Figure 8:
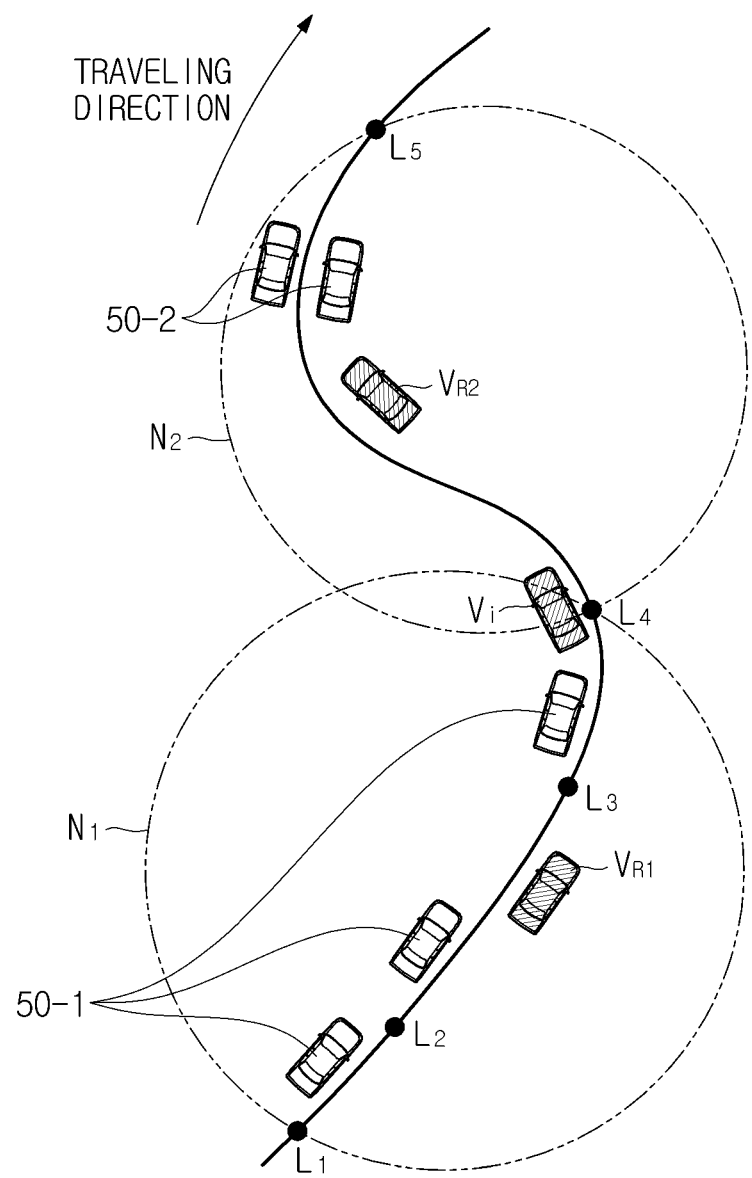
FIG. 8 is a view for explaining link speed of a road link calculated if the size of a network is larger than the size of the road link.

FIG. 8 is a view for explaining link speed of a road link calculated if the size of a network is larger than the size of the road link.

The controller 130 of each of the representative vehicles $V_{R1}$ and $V_{R2}$ that represent the networks N1 and N2, respectively, calculates a representative speed of each network N1, N2.

If the plurality of road links (L1~L2, L2~L3, and L3~L4) are matched to the first network N1, link speed of the plurality of road links (L1~L2, L2~L3, and L3~L4) included in the first network N1 may be determined as a representative speed of the first network N1.

In this case, the controller 130 of the first representative vehicle $V_{R1}$ may calculate the representative speed of the first network N1 and determine the link speed of the plurality of road links (L1~L2, L2~L3, and L3~L4) included in the first network N1 to be the representative speed of the first network N1.

The calculated link speed of the plurality of road links (L1~L2, L2~L3, and L3~L4) may be informed by the communication device 110 of the first representative vehicle $V_{R1}$ to other representative vehicle $V_{R2}$ or to the traffic control center.

Figure 9:
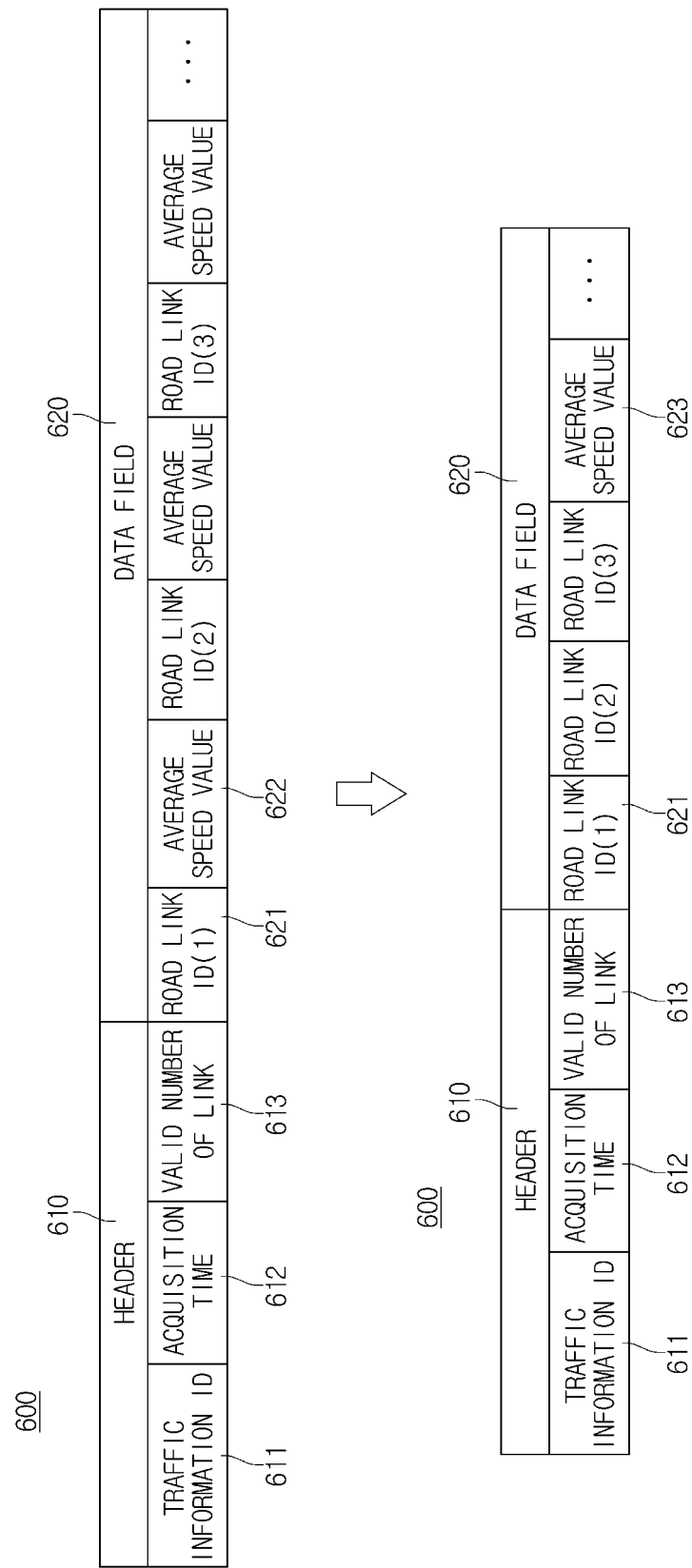
FIG. 9 shows a data structure of traffic information to be stored in different forms of the present disclosure.

FIG. 9 shows a data structure of traffic information to be stored in different forms of the present disclosure.

Traffic information collected in real time through V2V communication includes lots of data included in various paths. Furthermore, the longer the path from the current location of the vehicle 100 to a destination is, the more the traffic information collected by relaying is accumulated, which causes excessive communication data and loads to be stored.

Accordingly, the controller 130 of the vehicle 100 may simplify the traffic information to be stored in the storage 120.

Specifically, the traffic information may be represented as a link speed value of a road link in which a representative vehicle selected in each range is located, and may have a structure, as shown in FIG. 9, in which a road link ID and a link speed value are specified.

Referring to the upper portion of FIG. 9, header 610 may include traffic information ID 611 to identify the traffic information, acquisition time 612 at which the traffic information is acquired, and the number 613 of links included in a data field 620.

The data field 620 includes a first road link ID 621 and a link speed value 622, and the link speed value 622 is calculated as shown in FIGS. 6 to 8. The data field 620 may also include a plurality of road link IDs 621 and link speed values 622.

The plurality of road link IDs 621 and link speed values 622 may be prioritized according to the order of priority set in the V2X standard. However, if the present disclosure is used in a country that has not had any related standard, the order of priority may be determined based on e.g., the safety-related information as described above.

In the meantime, to further simplify the traffic information to be stored in the storage 10, the controller 130 of the vehicle 100 may summarize and store link speed values of a plurality of road links if the link speeds of the plurality of road links are in a limited range (e.g., within a range of +/−5 Km/h), as shown in the lower portion of FIG. 9. In this case, the controller 130 may store a link speed value of a road link among the plurality of road link speeds of the plurality of road links as a representative link speed value 623.

The simplifying process of FIG. 9 is, however, only by way of example, and there may be many modifications thereof.

The aforementioned procedure of operations performed by the communication device 110, the storage 120, and the controller 130 of the vehicle 100 may be performed in series and may constitute the control method of the vehicle 100 in one form of the present disclosure.

Some components of the vehicle 100 may be implemented in software, or hardware such as Field Programmable Gate Arrays (FPGAs) and Application Specific Integrated Circuits (ASICs).

According to forms of the present disclosure, a vehicle and a control method thereof may collect traffic information desired by the vehicle in real time and use the traffic information to improve the quality of navigation services without a need for an extra traffic information center.

Exemplary forms of the present disclosure have been described above. In the exemplary forms described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary forms, the forms can thus be implemented through computer readable code/instructions in/on a medium, e.g., a computer readable medium, to control at least one processing element to implement any above described exemplary form. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary forms have been described with respect to a limited number of forms, those skilled in the art, having the benefit of this disclosure, will appreciate that other forms can be devised which do not depart from the scope of the present disclosure.

What is claimed is:

1. A vehicle comprising:
   a communication device configured to communicate with a nearby vehicle within a predetermined range based on a Vehicle-to-Vehicle (V2V) communication method, and
   a controller configured to:
      form a first network with the nearby vehicle and calculate a representative speed of the first network based on at least one of speed information of a first vehicle or speed information of the nearby vehicle,
      calculate a link speed of a road link based on the representative speed of the first network, and
      determine the representative speed of the first network as the link speed of the road link when a difference in size between the first network and the road link is less than a predetermined margin of error.

2. The vehicle of claim 1, wherein when a size of the first network is smaller than a size of the road link, the controller is configured to calculate the link speed of the road link based on the representative speed of the first network and a representative speed of a second network located in the road link.

3. The vehicle of claim 1, wherein the communication device is configured to receive a representative speed of a second network located in the road link from a second vehicle, and
   wherein the controller is configured to calculate an average of the representative speed of the first network and the representative speed of the second network located in the road link for the link speed of the road link, when a size of the first network is smaller than a size of the road link.

4. The vehicle of claim 1, wherein the communication device is configured to receive a representative speed of a second network located in the road link from a second vehicle, and when a size of the first network is smaller than a size of the road link, the controller is configured to calculate the link speed of the road link as:

$$VL = \frac{DL}{\sum_{i=1}^{n} Ti}$$

$$Ti = \frac{Di}{Vi}$$

where: VL denotes a link speed of the road link, DL denotes a length of the entire section of the road link, Di denotes a length of a partial section occupied by an i-th network located in the road link, and Vi denotes a representative speed of the i-th network located in the road link.

5. The vehicle of claim 1, wherein the controller is configured to determine the representative speed of the first network as the link speed of the road link when a size of the network is larger than a size of the road link.

6. The vehicle of claim 1, wherein the communication device is configured to send or receive a preoccupancy signal for representative status to or from the nearby vehicle, and
   wherein the controller is configured to calculate the representative speed of the first network based on the speed information of the nearby vehicle, when the first vehicle sends the preoccupancy signal earlier than the nearby vehicle.

7. The vehicle of claim 1, wherein the communication device is configured to send to or receive from the nearby vehicle a preoccupancy signal for representative status, and
   wherein the controller is configured to calculate the representative speed of the first network based on the speed information of the nearby vehicle, when the first vehicle sends the preoccupancy signal earlier than the nearby vehicle and receives a signal to agree with the preoccupancy from the nearby vehicle.

8. The vehicle of claim 1, wherein the communication device is configured to send or receive a preoccupancy signal for representative status to or from the nearby vehicle, and
   wherein the controller is configured to select a representative vehicle by comparing a preoccupancy value of a preoccupancy signal sent from the first vehicle and a preoccupancy value of a preoccupancy signal sent from the nearby vehicle, when the first vehicle and the nearby vehicle simultaneously send the preoccupancy signals.

9. The vehicle of claim 8, wherein the controller is configured to calculate the representative speed of the first network based on the speed information of the nearby vehicle, when the first vehicle is selected as the representative vehicle.

10. A control method of a vehicle, the control method comprising the steps of:
    receiving speed information from a nearby vehicle within a predetermined range,
    calculating, by a controller, a representative speed of a first network formed by a first vehicle and the nearby vehicle based on at least one of speed information of the first vehicle or speed information of the nearby vehicle, and
    calculating, by the controller, a link speed of a road link based on the representative speed of the first network,
    wherein the step of calculating of the link speed of the road link comprises determining, by the controller, the representative speed of the first network as the link speed of the road link when a size of the first network and a size of the road link are in the same range.

11. The control method of claim 10, wherein when the size of the first network is smaller than the size of the road link, the controller calculates the link speed of the road link based on the representative speed of the first network and a representative speed of a second network located in the road link.

12. The control method of claim 10, further comprising: receiving, by the controller, a representative speed of a second network located in the road link from a second vehicle before the calculating of the link speed,
wherein the step of calculating of the link speed comprises calculating, by the controller, an average of the representative speed of the first network and the representative speed of the second network located in the road link for the link speed of the road link, when the size of the first network is smaller than the size of the road link.

13. The control method of claim 10, further comprising: receiving, by the controller, a representative speed of a second network located in the road link from a second vehicle before the step of calculating of the link speed,
wherein when the size of the first network is smaller than the size of the road link, the link speed of the road link is calculated as:

$$VL = \frac{DL}{\sum_{i=1}^{n} Ti}$$

$$Ti = \frac{Di}{Vi}$$

where VL denotes a link speed of the road link, DL denotes a length of the entire section of the road link, Di denotes a length of a partial section occupied by an i-th network located in the road link, and Vi denotes a representative speed of the i-th network located in the road link.

14. The control method of claim 10, wherein the step of calculating of the link speed comprises determining, by the controller, the representative speed of the first network as the link speed of the road link when the size of the first network is larger than the size of the road link.

15. The control method of claim 10, further comprising: sending to or receiving from the nearby vehicle a preoccupancy signal for representative status before the step of receiving of the speed information from the nearby vehicle,
wherein the representative speed of the first network is calculated based on the speed information of the nearby vehicle, when the first vehicle sends the preoccupancy signal earlier than the nearby vehicle.

16. The control method of claim 10, further comprising: sending to or receiving from the nearby vehicle a preoccupancy signal for representative status before the receiving of the speed information of the nearby vehicle,
wherein the representative speed of the first network is calculated based on the speed information of the nearby vehicle, when the first vehicle sends the preoccupancy signal earlier than the nearby vehicle and receives a signal to agree with the preoccupancy signal from the nearby vehicle.

17. The control method of claim 10, further comprising: before the receiving of the speed information from the nearby vehicle,
communicating between the first vehicle and the nearby vehicle to send or receive a preoccupancy signal for representative status, and
selecting a representative vehicle by comparing a preoccupancy value of the preoccupancy signal sent from the first vehicle with a preoccupancy value of the preoccupancy signal sent from the nearby vehicle, when the first vehicle and the nearby vehicle simultaneously send the preoccupancy signal.

18. The control method of claim 17, wherein the representative speed of the network is calculated based on the speed information of the nearby vehicle, when the first vehicle is selected as the representative vehicle.

* * * * *